(12) United States Patent
Jung

(10) Patent No.: US 9,236,638 B2
(45) Date of Patent: Jan. 12, 2016

(54) CHARGING/DISCHARGING SYSTEM FOR SOLAR LIGHT POWER GENERATOR IN SMART GRID ENVIRONMENT WITH REAL-TIME PRICING, DUPLEX CONVERTOR OF CHARGING/DISCHARGING SYSTEM, AND CHARGING/DISCHARGING METHOD FOR SOLAR LIGHT POWER GENERATOR

(75) Inventor: Hyun Chul Jung, Gangnam-gu (KR)

(73) Assignee: KT Corporation, Seongnam-si (KR)

(*) Notice: Subject to any disclaimer, the term of this patent is extended or adjusted under 35 U.S.C. 154(b) by 1055 days.

(21) Appl. No.: 13/314,406

(22) Filed: Dec. 8, 2011

(65) Prior Publication Data
US 2012/0153888 A1   Jun. 21, 2012

(30) Foreign Application Priority Data

Dec. 17, 2010   (KR) .................. 10-2010-0130130

(51) Int. Cl.
| | |
|---|---|
| *H02J 7/00* | (2006.01) |
| *H01M 10/44* | (2006.01) |
| *H01M 10/46* | (2006.01) |
| *H02J 3/38* | (2006.01) |

(Continued)

(52) U.S. Cl.
CPC .............. *H01M 10/465* (2013.01); *H02J 3/008* (2013.01); *H02J 3/385* (2013.01); *H02J 7/35* (2013.01); *Y02E 10/58* (2013.01); *Y04S 50/10* (2013.01)

(58) Field of Classification Search
USPC .................................................. 320/101, 103
See application file for complete search history.

(56) References Cited

U.S. PATENT DOCUMENTS

| | | | |
|---|---|---|---|
| 6,925,361 B1* | 8/2005 | Sinnock .................. | 700/286 |
| 2003/0120959 A1* | 6/2003 | Bohrer et al. ........... | 713/320 |
| 2008/0052145 A1* | 2/2008 | Kaplan et al. .......... | 705/8 |

(Continued)

FOREIGN PATENT DOCUMENTS

| | | |
|---|---|---|
| JP | 1998-023686 A | 1/1998 |
| JP | 2005143218 A | 6/2005 |

(Continued)

OTHER PUBLICATIONS

Choi, Chul Ho, "Green growth—Electrical energy revolution with Smart Grid," Weekly Gonggam (ROK Policy Information Service), Annual Special Apr. 22, http://gonggam.korea,kr; http://blog.daum.net/printView.html?articlePrint_69, Apr. 21, 2009, last visited Feb. 27, 2013.

*Primary Examiner* — Samuel Berhanu
(74) *Attorney, Agent, or Firm* — Sughrue Mion, PLLC

(57) ABSTRACT

Provided are a charging and discharging system for a solar light power generator in a smart grid environment, a method of operating the same, and a duplex converter for charging and discharging electricity into/from a battery. The system includes: an electricity price monitoring part which collects electricity price information from an electric grid; an electricity charge amount monitoring part which collects electricity charge amount information of a battery; a charge and discharge determination part which determines whether electricity supplied from the electric grid is to be charged into the battery or whether electricity stored in the battery via the electric grid or the solar light power generator is to be discharged to the electric grid, based on the price information and the charge amount information; and a charging and discharging part including the battery, so that electricity is charged into or discharged from the battery based on the determination.

10 Claims, 10 Drawing Sheets

(51) Int. Cl.
*H02J 7/35* (2006.01)
*H02J 3/00* (2006.01)

(56) References Cited

U.S. PATENT DOCUMENTS

2009/0313033 A1* 12/2009 Hafner et al. .................. 705/1
2010/0010685 A1* 1/2010 Kang ........................... 700/296
2010/0019577 A1 1/2010 Barlock et al.
2010/0174418 A1* 7/2010 Haugh .......................... 700/295
2010/0276998 A1* 11/2010 Luo et al. ...................... 307/46
2011/0050158 A1* 3/2011 MacDonald et al. ......... 320/101

FOREIGN PATENT DOCUMENTS

| KR | 200360972 | 9/2004 |
| KR | 200402306 | 11/2005 |
| KR | 1020090026029 A | 3/2009 |

* cited by examiner

CHARGING/DISCHARGING SYSTEM FOR SOLAR LIGHT POWER GENERATOR IN SMART GRID ENVIRONMENT WITH REAL-TIME PRICING, DUPLEX CONVERTOR OF CHARGING/DISCHARGING SYSTEM, AND CHARGING/DISCHARGING METHOD FOR SOLAR LIGHT POWER GENERATOR

CROSS-REFERENCE TO RELATED APPLICATION

This application claims priority from Korean Patent Application No. 10-2010-0130130 filed on Dec. 17, 2010 in the Korean Intellectual Property Office, the disclosure of which is incorporated herein by reference in its entirety.

BACKGROUND

1. Field

Apparatuses and methods consistent with exemplary embodiments relate to a charging and discharging system for a solar light power generator in a real-time pricing environment used by a smart grid, a duplex converter of the charging and discharging system, and a charging and discharging method for a solar light power generator. More particularly, apparatuses and methods consistent with exemplary embodiments relate to a charging and discharging system in which electricity is charged into a battery of the charging and discharging system from a solar light power generator, the charged electricity is sold to an electric grid (e.g., a power network, a smart grid or a power grid), and the electricity of the electric grid is charged into the battery when the electricity price of the real-time price is determined to be low regardless of solar light power generation, to a duplex converter of the charging and discharging system and to a charging and discharging method for a solar light power generator.

2. Description of the Related Art

With the exceedingly rapid advancements in modern society, energy consumption is geometrically increasing, and causing many environmental problems including the generation of carbon dioxide ($CO_2$). Accordingly, in recent industrial developments, overcoming the environmental problems and efficient use of electric energy are considered very important.

Furthermore, as a result of the development of renewable energy, solar light power generators have remarkably spread. Typically, a solar light power generator produces electric energy from a solar light module so that such electric energy is used as energy, and is connected to an electric grid to sell electricity.

However, in order to increase the effect relative to the investment based on the real-time pricing used by a smart grid, the usability of a battery in which a costly investment is made should be increased, in addition to using a typical method. The battery is bound to a mechanical device of the solar light power generator, and the smart grid is a next-generation intelligent network in which information technology (IT) is added to a related art power network so that a power supplier and a consumer interchange real-time information with each other, thereby optimizing energy efficiency.

In order to increase the usability of the battery, the energy stored as a result of power generation using solar light energy is sold at an optimal price depending on the real-time pricing of the electric grid. In the case where the energy price of the electric grid is low (e.g., at nighttime), there may be a need to store energy in the battery using the energy of the electric grid to sell it at an optimal price.

A system that satisfies such a need may include all four devices of a DC to DC converter (i.e., a battery) for charging solar light energy, a maximum power point tracking or maximum power point transient (MPPT) system for maximally utilizing solar light energy production, a grid-connected inverter for selling electricity charged into the battery to an electric grid, and a rectifier for charging the battery with electricity of the electric grid when the electricity price of the electric grid is low.

When all of four devices are constructed together, cost, efficiency, or installation space problems may occur and there may be a problem related to miniaturization for home use. Hence, there is urgently needed a technique that achieves a single power conversion system having the above four operations.

SUMMARY

Accordingly, aspects of one or more exemplary embodiments address problems occurring in the related art and an object of an exemplary embodiment is to provide a charging and discharging system for a solar light power generator in a smart grid environment with real-time pricing, which is able to increase usability of a battery provided therein, a duplex converter of the charging and discharging system, and a charging and discharging method for a solar light power generator.

According to an aspect of an exemplary embodiment, there is provided a charging and discharging system for a solar light power generator in a smart grid environment with real-time pricing, the charging and discharging system including: an electricity price monitoring part which collects electricity price information from an electric grid; an electricity charge amount monitoring part which collects electricity charge amount information of a battery of the charging and discharging system; a charge and discharge determination part which determines whether electricity supplied from the electric grid is to be charged into the battery or whether electricity stored in the battery via the electric grid or the solar light power generator is to be discharged to the electric grid, based on the collected electricity price information and the collected electricity charge amount information; and a charging and discharging part including the battery, so that the electricity is charged into or discharged from the battery based on the determination made by the charge and discharge determination part.

The charging and discharging system may further include a metering part which measures electricity usage based on an amount of electricity charged into the battery and an amount of electricity discharged from the battery and calculates an electricity price based on the measured electricity usage.

The electricity price monitoring part may collect electricity price information that varies with time from the electric grid, and the metering part may calculate the electricity price based on the collected electricity price information that varies with time.

When electricity is charged into the battery, the metering part may perform a forward measurement based on the amount of the charged electricity, and when electricity is discharged from the battery, the metering part may perform backward measurement based on the amount of the discharged electricity, and the metering part may measure the amount of electricity so that the electricity price is calculated differently depending on the electricity price information that varies with time.

The electricity price monitoring part may collect the electricity price information varying with time from the electric grid, and the charge and discharge determination part may determine to discharge electricity stored in the battery when the electricity price information varying with time is larger than a preset value, and may determine to charge the battery with electricity when the collected electricity price information is smaller than or equal to a preset value.

The charge and discharge determination part may determine whether the electricity is to be charged into the battery or is to be discharged from the battery by calculating an average value of the electricity price information varying with time for a preset period and comparing the average value to a present electricity price.

The charging and discharging part may adjust a rate of discharge when the electricity is discharged from the battery.

According to an aspect of another exemplary embodiment, there is provided a duplex converter for at least one of charging and discharging electricity into/from a battery of a charging and discharging part of a charging and discharging system for a solar light power generator in a smart grid environment with real-time pricing, the duplex converter including: a transformer coupled to an electric grid and the battery so that a signal supplied from the electric grid or a signal supplied from the battery is transformed and output; a charge and discharge selection switch which is selectively on or off depending on whether electricity is charged into or discharged from the battery and which is connected to a node for dividing a coil of the transformer on a battery side; charge switching elements which are selectively turned on or off based on a waveform of the signal supplied from the electric grid when electricity is charged into the battery; and discharge switching elements which are selectively turned on or off based on a waveform of the signal supplied from the battery when electricity is discharged from the battery.

The battery may include two batteries separated by a neutral line, and the two batteries may be alternately charged based on an operation of the charge switching elements, and may be alternately discharged based on an operation of the discharge switching elements.

A number of turns of a coil of the transformer on an electric grid side may be smaller than a number of turns of a coil of the transformer on the battery side, and may be larger than half the number of turns of the coil of the transformer on the battery side.

The charge and discharge selection switch may be shorted out when the electricity is charged into the battery, and may be opened when the electricity is discharged from the battery.

A tip of the transformer on the battery side may be connected between the charge switching elements and between the discharge switching elements, via an inductor.

According to an aspect of another exemplary embodiment, there is provided a duplex converter for at least one of charging and discharging electricity into/from a battery of a charging and discharging part of a charging and discharging system for a solar light power generator in a smart grid environment with real-time pricing, the duplex converter including: charge switching elements which are selectively turned on or off based on a waveform of a signal supplied from a smart grid when electricity is charged into the battery; and discharge switching elements which are selectively turned on or off based on a waveform of a signal supplied from the battery when electricity stored in the battery is discharged to the smart grid, wherein when at least one of the charge switching elements is turned on, a voltage of the smart grid is raised and charged into the battery by control of pulse width modulation to adjust turn-on time and turn-off time of the turned-on at least one charge switching element and by voltages stored in capacitors when the battery is charged, and when at least one of the discharge switching elements is turned on, the raised voltage of the battery is discharged to the smart grid by control of pulse width modulation to adjust the turn-on time and the turn-off time of the turned-on at least one discharge switching element.

The duplex converter may further include an inductor connected between the charge switching elements and between the discharge switching elements, and wherein a phase of a signal discharged from the battery may lead a phase of a signal of the smart grid by the inductor.

According to an aspect of another exemplary embodiment, there is provided a method of at least one of charging and discharging electricity into/from a battery of a charging and discharging part of a charging and discharging system for a solar light power generator in a smart grid environment with real-time pricing, the method including: receiving electricity price information varying in real time from an electric grid; receiving electricity charge amount information stored in the battery; determining whether electricity is to be purchased from the electric grid or whether electricity stored in the battery via the electric grid or the solar light power generator is to be sold to the electric grid, based on the received electricity price information and the received electricity charge amount information; and charging or discharging electricity into/from the battery, based on a result of the determining.

According to an aspect of another exemplary embodiment, there is provided a method of charging and discharging electricity into/from a battery of a charging and discharging part of a charging and discharging system for a solar light power generator in a smart grid environment with real-time pricing, the method including: charging switching elements, of a duplex converter, which are selectively turned on or off based on a waveform of a signal supplied from a smart grid when the electricity is charged into the battery; and discharging switching elements, of the duplex converter, which are selectively turned on or off based on a waveform of a signal supplied from the battery when the electricity stored in the battery is discharged to the smart grid, wherein when at least one of the charge switching elements is turned on, a voltage of the smart grid is raised and charged into the battery by control of pulse width modulation to adjust a turn-on time and a turn-off time of the turned-on at least one charge switching element and by voltages stored in capacitors when the battery is charged, and when at least one of the discharge switching elements is turned on, the raised voltage of the battery is discharged to the smart grid by control of pulse width modulation to adjust the turn-on time and the turn-off time of the turned-on at least one discharge switching element.

BRIEF DESCRIPTION OF THE DRAWINGS

The above and other objects, features and advantages will be more clearly understood from the following detailed description taken in conjunction with the accompanying drawings, in which.

DETAILED DESCRIPTION OF EXEMPLARY EMBODIMENTS

Figure 1:
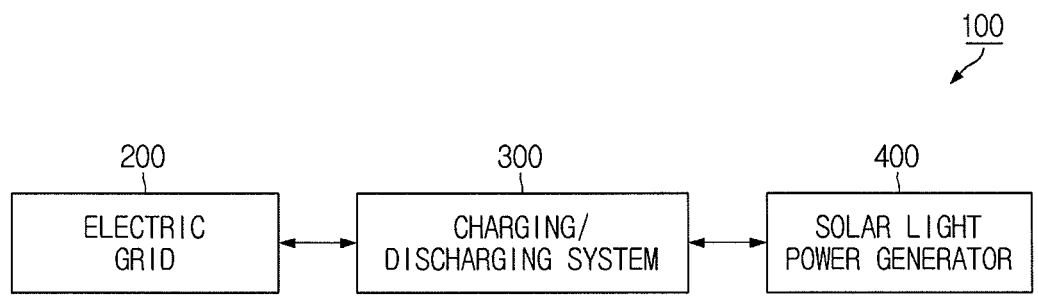
FIG. 1 is a block diagram showing an electric system 100 including a charging and discharging system 300 for a solar light power generator 400 in a smart grid environment with real-time pricing according to an exemplary embodiment.

Hereinafter, exemplary embodiments will be described in detail while referring to the accompanying drawings. Throughout the drawings, the same reference numerals are used to refer to the same or similar components. Expressions such as "at least one of," when preceding a list of elements, modify the entire list of elements and do not modify the individual elements of the list.

FIG. 1 is a block diagram showing an electric system 100 including a charging and discharging system 300 for a solar light power generator 400 in a smart grid environment with real-time pricing according to an exemplary embodiment.

With reference to FIG. 1, the electric system 100 includes an electric grid (e.g., a smart grid) 200, a charging and discharging system 300, and a solar light power generator 400.

The electric grid 200 supplies the electricity used to charge a battery provided in the charging and discharging system 300, and receives electricity stored in the battery of the charging and discharging system 300.

The electric grid 200, which is a system for supplying the charging and discharging system 300 with power used for charging, a variety of pieces of information used for a charge and discharge determination, and information used to calculate electricity prices, includes a system of an electric exchange and so on, and may include a variety of servers for managing electricity usage and electricity prices.

The charging and discharging system 300 receives information (i.e., electricity price information) regarding electricity prices that vary in real time from the electric grid 200, purchases (i.e., charges) electricity of the electric grid 200, and stores electricity generated by the solar light power generator 400 or electricity purchased from the electric grid 200 in the battery provided therein so that the stored electricity may be sold (i.e., discharged) to the electric grid 200. The solar light power generator 400 may include at least one of a solar light panel including a plurality of solar cells for generating solar light, a controller for controlling an angle between the solar light panel and the sun, and a battery.

Also, the charging and discharging system 300 receives information (i.e., electricity charge amount information) about the amount of electricity charged into the battery from the battery provided therein, so that electricity may be charged in or discharged from the battery provided therein.

The charging and discharging system 300 may effectively charge or discharge electricity using the electricity price information and the electricity charge amount information, wherein a single converter having high mobility responsible for both charging and discharging may be used to charge and discharge electricity to/from the battery.

The charging and discharging system 300 may transmit to or receive from the electric grid 200 and the solar light power generator 400 information used for charging and discharging electricity by any of a variety of communication methods including wired/wireless communication and power line communication (PLC).

The charging and discharging system 300 may transmit to or receive from the electric grid 200 price information of the electric grid 200 used to charge and discharge, measurement information about the amount charged or discharged to calculate the price, and purchase and expenditure information.

Also, the charging and discharging system 300 may set a variety of charge and discharge standards and purchase and sale standards, based on the price information of the electric grid 200 for charging and discharging, and enables remote control.

The charging and discharging system 300 transmits information about the amount and cost of selling or purchasing electricity to or from the electric grid 200 via user information authentication to the electric grid 200 so as to bill the cost, and also may transmit to or receive from the electric grid 200 billing information which enables the automatic calculation of a sales price.

The charging and discharging system 300 includes a grid-connected inverter system that charges the battery with at least one of electricity generated by the solar light power generator 400 and electricity purchased from the electric grid 200 and sells the charged electricity to the electric grid (i.e., smart grid) 200. The charging and discharging system 300 includes a duplex converter for charging the battery with the electricity of the electric grid 200 when the electricity price of real-time pricing of the electric grid 200 is determined to be low.

Figure 2:
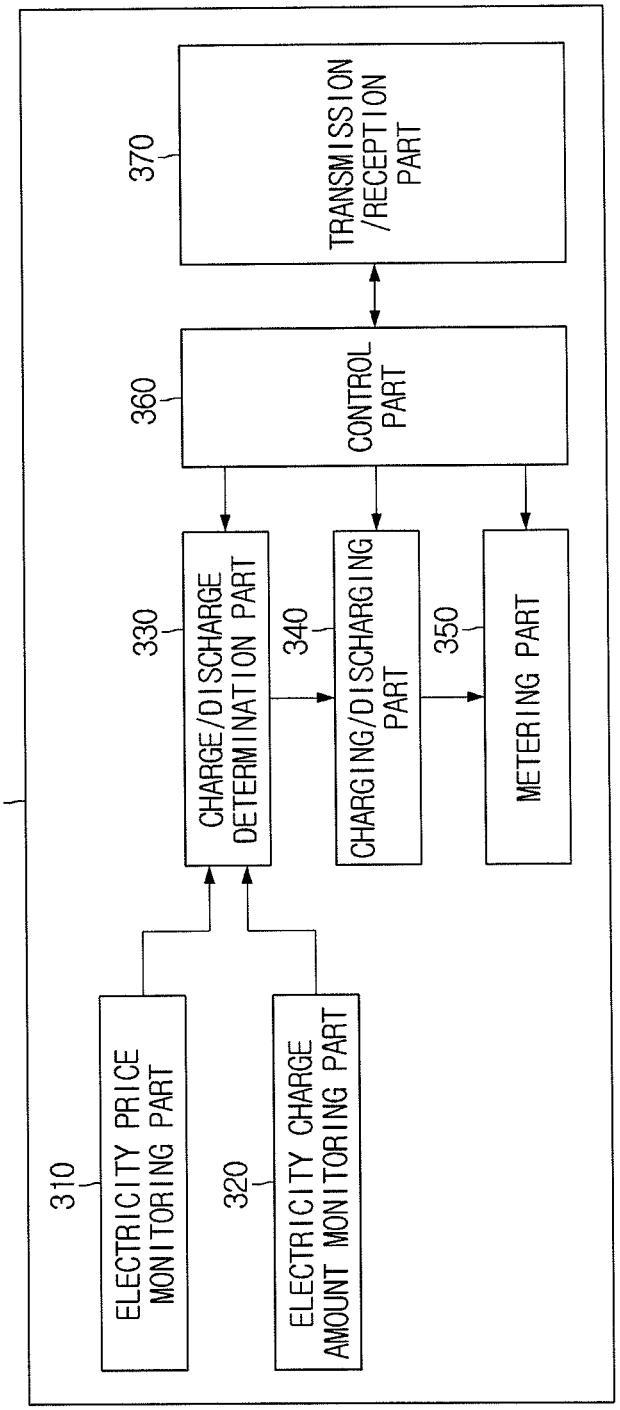
FIG. 2 is a block diagram showing a charging and discharging system 300 for a solar light power generator in a smart grid environment with real-time pricing according to an exemplary embodiment.

FIG. 2 is a block diagram showing the charging and discharging system 300 for a solar light power generator in a smart grid environment with real-time pricing according to an exemplary embodiment.

With reference to FIG. 2, the charging and discharging system 300 includes an electricity price monitoring part 310, an electricity charge amount monitoring part 320, a charge and discharge determination part 330, a charging and discharging part 340, a metering part 350, a control part 360, and a transmission and reception part 370.

The electricity price monitoring part 310 receives information (i.e., electricity price information) about electricity price in real time from the electric grid 200 (see FIG. 1). The electricity price may be billed differently per time period, and the electricity price monitoring part 310 may receive information about the electricity price that varies with time from the electric grid 200, an electric power exchange, and a variety of power management servers.

The electricity price monitoring part 310 collects the electricity price information that varies with time from the electric grid 200.

The electricity charge amount monitoring part 320 collects information (i.e., electricity charge amount information) about the amount of electricity charged into the battery of the charging and discharging system 300. The electricity charge amount monitoring part 320 may collect the electricity charge amount information detected, for example, by a battery management system (BMS) (not shown), and may receive the charge amount as a percentage relative to the total capacitance of the battery provided in the charging and discharging part 340.

The charge and discharge determination part 330 determines whether electricity is to be charged into or discharged from the battery of the charging and discharging part 340, based on the electricity price information and the electricity charge amount information respectively transferred from the electricity price monitoring part 310 and the electricity charge amount monitoring part 320. In the charge and discharge determination part 330, a standard value for the charge and discharge determination may be directly set via input by a user or may be set using a remote wired/wireless communication mode, and the purchase or sale of electricity via the charge and discharge behavior depending on the set standard value may be determined. According to another exemplary embodiment, the above battery may be provided in the solar light power generator 400 (see FIG. 1).

The charge and discharge determination part 330 determines to discharge electricity from the battery when the electricity price information (or electricity price) that varies with time collected by the electricity price monitoring part 310 is larger than a preset value, and determines to charge electricity into the battery when the collected electricity price information is smaller than or equal to a preset value.

In the charge and discharge determination part 330, the average value of electricity price information that varies with time may be calculated for a preset period, and the calculated average value is compared to the present electricity price, so that whether electricity is to be charged into the battery or discharged from the battery is determined.

The charge and discharge determination part 330 may determine whether to charge or discharge by calculating the average value of electricity prices for a preset period (e.g., per day) and comparing the calculated average value with the present electricity price.

For example, the charge and discharge determination part 330 may determine to charge electricity into the battery of the charging and discharging part 340 when the present electricity price is 80% or less of the average price on the previous day, and may determine to discharge electricity from the battery of the charging and discharging part 340 when the present electricity price is 120% or more of the average price on the previous day.

Also, the charge and discharge determination part 330 may determine whether there is a need to perform charging based on the amount of electricity charged into the battery of the charging and discharging part 340. For example, the charge and discharge determination part 330 determines to charge electricity when the amount of electricity charged into the battery of the charging and discharging part 340 is 30% or less of the total capacitance, so that the charging of electricity may be put on standby. When the amount of charged electricity is 98% or more of the total capacitance, it may be determined to stop charging with electricity.

Furthermore, in the case where electricity is discharged from the battery 10 of the charging and discharging part 340, the charge and discharge determination part 330 may adjust the rate of discharge.

The charging and discharging part 340 is connected to the electric grid 200 and the solar light power generator 400 so that electricity is charged or discharged. The charging and discharging part 340 may charge and discharge electricity into/from the battery provided therein, depending on the charge and discharge determination made by the charge and discharge determination part 330. The charging and discharging part 340 supplies electricity received from the electric grid 200 or the solar light power generator 400 to the battery of the charging and discharging part 340, thereby charging the battery with electricity. Also, the charging and discharging part 340 may supply electricity to the electric grid 200 from the battery thereof so that electricity is discharged.

The charging and discharging part 340 may efficiently charge and discharge electricity by a duplex converter provided in the charging and discharging part 340 responsible for both charging and discharging. In order to supply the grid with electricity at a constant voltage, constant frequency and good quality based on the determination made by the charge and discharge determination part 330, an insulated gate bipolar transistor (IGBT) may be provided as a kind of switch that may control a phase, and the amount of power and the power factor may be controlled to adjust the rate of discharge (i.e., the sale rate). The charging and discharging part 340 may include a single duplex converter responsible for both charging and discharging the battery.

The metering part (i.e., a meter) 350 measures electricity usage based on the amount of electricity charged into the battery and the amount of electricity discharged from the battery, and calculates the electricity price depending on the preset standard based on the measured electricity usage. For example, the above standard may be a standard for electricity price received from the electric grid 200.

The metering part 350 calculates the electricity price based on the electricity price information that varies with time. The metering part 350 measures the electricity usage that is transmitted to and received from the electric grid 200 via charge and discharge, respectively, thus calculating an electricity price to be billed.

The metering part 350 may measure and display a real-time electricity price depending on the electricity usage to be billed and the standard price of the electric grid 200, in proportion to the electricity usage. Also, the metering part may calculate the electricity price per user based on user authentication information of the solar light power generator 400 (see FIG. 1).

In the case where electricity is purchased, the metering part 350 measures electricity usage received from the electric grid 200, and may calculate an electricity price to be billed in consideration of an electricity purchase price corresponding to the measured time and the amount of power. On the other hand, in the case where electricity is sold, an electricity sale price corresponding to the amount of power supplied to the electric grid 200 and the time is measured, and thus the electricity price to be billed may be calculated.

Furthermore, in the case where electricity is charged into the battery of the charging and discharging part 340, the metering part 350 may perform forward measurement based on the amount of charged electricity. On the other hand, in the case where electricity is discharged from the battery of the charging and discharging part 340, the metering part 350 may perform backward measurement based on the amount of discharged electricity. Also, the amount of electricity may be measured so that different electricity prices are calculated depending on the electricity price that varies with time.

For example, in the case where electricity is purchased, the divisions of the metering part 350 may be moved in a forward direction. On the other hand, in the case where electricity is sold, the divisions of the metering part 350 may be moved in a backward direction. Also, the electricity price may be calculated under the condition of the divisions of the metering part being moved differently depending on changes in electricity price.

The electricity price thus calculated is supplied to the electric grid 200, and may thus be imposed on a user of the solar light power generator 400. As such, the electric grid 200 receives the authentication information collected by, for example, a recognition number plate or the like of the solar light power generator 400 from the solar light power generator 400 and may authenticate the user, and may guide the position of the charging and discharging system 300.

The control part 360 controls the operation of components included in the charging and discharging system 300, and controls respective parts (i.e., components) shown in FIG. 2 so that the charging and discharging system 300 purchases electricity from the electric grid 200 or sells electricity to the electric grid 200 to charge and discharge electricity and to calculate the electricity price.

Also, the control part 360 receives the electricity price information and the settings of the user and then transmits the received electricity price information and the received settings to the charge and discharge determination part 330, and controls switches of the charging and discharging part 340 by a control processor (MPPT) of the charge and discharge determination part 330, so that charging and discharging may be performed.

Also, the control part 360 controls the operation state of respective parts (i.e., components) of the charging and discharging system 300 so as to display the state on a display (not shown) of the charging and discharging system 300, and also controls continuous monitoring of the amount power, the operation information, and information about failure and erroneous operation of respective parts, storing of such results, and displaying thereof depending on, for example, the settings of a user. Furthermore, the control part may transmit information to the transmission and reception part 370 depending on the kind of information.

The transmission and reception part 370 transmits to or receives from the electric grid 200 a variety of pieces of information used to make a determination to charge and discharge and to calculate the electricity price.

The transmission and reception part 370 supplies the electric grid 200 with user information and position information of the charging and discharging system 300 via, for example, at least one of credit card recognition, mobile phone recognition, automatic recognition of a personal identification number, manual input, etc., so that a user of the solar light power generator 400 is authenticated for price calculation, and may transmit or receive the amount of purchased or sold power and the billing information to or from the electric grid 200 via a wired or wireless communication mode. As such, particularly useful as a near field communication mode is power line communication (PLC), wireless LAN (Wi-Fi), Zigbee, a ubiquitous sensor network (USN), or radio frequency identification (RFID).

The transmission and reception part 370 transmits or receives standard information used for the charge and discharge determination to be made by the charge and discharge determination part 330 to or from a user of the solar light power generator 400, and may transmit or receive information about charge amount and discharge amount, billing information, and information about the present charge amount detected by the electricity charge amount monitoring part 320 and about the residual charge time via a wired or wireless communication mode. As such, particularly useful as a telecommunication mode is PLC, general telephones (PSTN), Internet (TCP/IP), wireless Internet (WIBRO), wideband code division multiple access (WCDMA), or CDMA.

Also, the transmission and reception part 370 may supply a user of the solar light power generator 400 with information about failure or an erroneous state of the charging and discharging system 300, and may transmit or receive antitheft position guide information via discrimination of the electronic serial number (i.e., the serial number of the solar light power generator 400) and system information and user setting information displayable on a display via a wired or wireless communication mode. In particular, the communication mode used may include SMS (message transmission), WIBRO (portable Internet), WCDMA, CDMA, WIFI, Internet (TCP/IP), telephone wires (PSTN), or PLC.

Also, the transmission and reception part 370 detects information about the voltage that varies depending on the kind of battery of the charging and discharging part 340 and about the capacitance per time using a battery management system (BMS), and may transmit or receive the detected information to or from the electric grid 200 by, for example, a wired or wireless communication mode. In particular, the communication mode used may include WIFI (corresponding to near field wireless communication), Bluetooth, PLC, or RFID such as RS485, RS422, or RS232.

As mentioned above, an exemplary embodiment relates to a grid-connected inverter system for charging electricity into the battery of the charging and discharging part 340 and selling the charged electricity to the electric grid 200. The system according to the present exemplary embodiment includes: the electricity price monitoring part 310 for collecting information about the electricity price from the electric grid; the electricity charge amount monitoring part 320 for collecting information about the amount of electricity charged into the battery; the charge and discharge determination part 330 for determining whether electricity is to be charged into the battery from the electric grid or whether electricity charged into the battery is to be discharged to the electric grid based on the electricity price information and the electricity charge amount information; the metering part 350 for measuring and displaying the electricity price to be billed in proportion to the power sale amount and the power usage; the control part 360 for controlling and managing the charging and discharging system; and the transmission and reception part 370 for transmitting or receiving information to or from the electric grid and the solar light power generator in a duplex mode.

Figure 3:
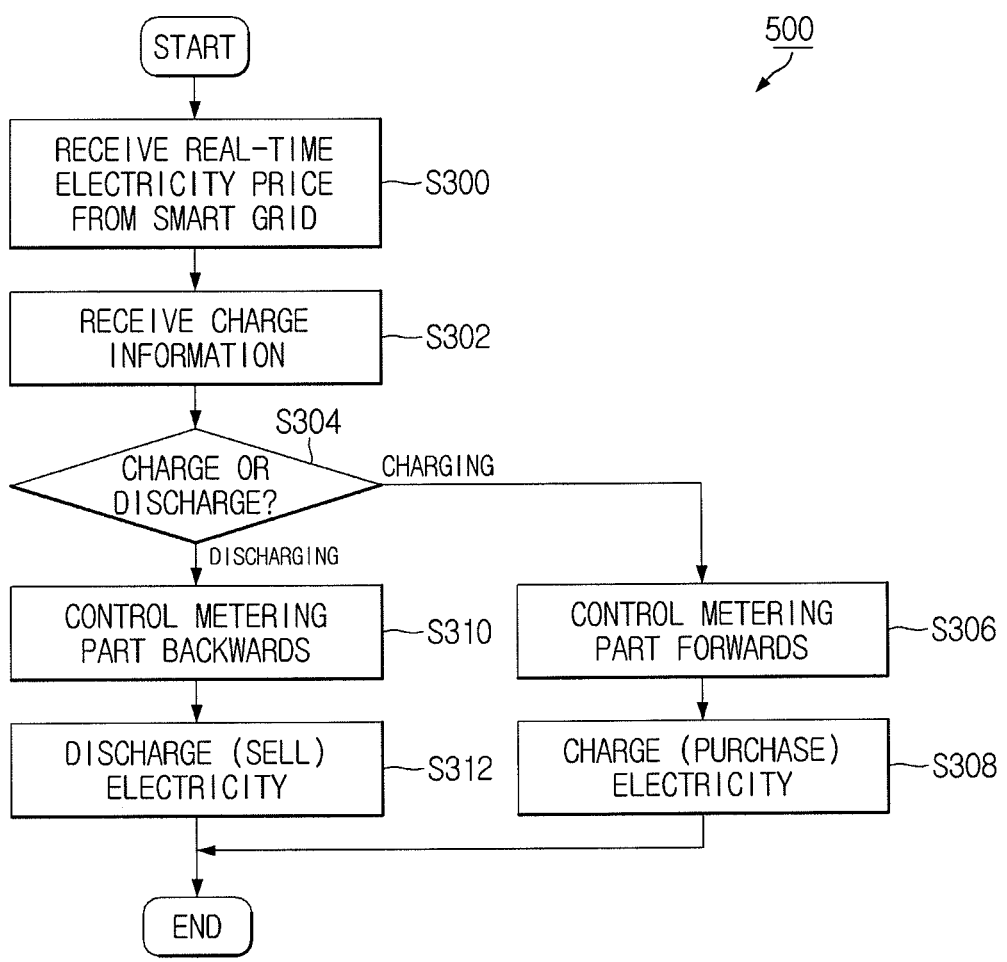
FIG. 3 is a flowchart showing a charging and discharging process 500 for a solar light power generator in a smart grid environment with real-time pricing according to an exemplary embodiment.

FIG. 3 is a flowchart showing a charging and discharging process 500 for a solar light power generator in a smart grid environment with real-time pricing according to an exemplary embodiment. The charging and discharging method 500 may be applied to the electric system 100 of FIG. 1 and the charging and discharging system 300 of FIG. 2.

Specifically, electricity price (i.e., electricity price information) from the electric grid (i.e., smart grid) 200 in operation S300. At operation S300, information about electricity price that varies in real time may be received from the electric grid 200.

Information (i.e., electricity charge amount information) about the amount of electricity charged (i.e., stored) into the battery of the charging and discharging part 340 is received in operation S302. At operation S302, the charge amount relative to the total capacitance of the battery of the charging and discharging part 340 may be received as a percentage.

Whether electricity is to be charged into the battery of the charging and discharging part 340 or whether electricity stored in the battery of the charging and discharging part 340 is to be discharged is determined in operation S304.

At operation S304, whether there is a need to charge (i.e., purchase) electricity into the battery of the charging and discharging part 340 from the electric grid 200 or whether electricity stored in the battery via the electric grid 200 or the solar light power generator 400 is to be discharged (i.e., sold) to the electric grid may be determined, based on the electricity price information received at operation S300 and the electricity charge amount information received at operation S302.

At operation S304, the average value of daily electricity prices may be calculated, and may be compared to the present electricity price, and thus whether to charge or discharge may be determined accordingly. Specifically, at operation S304, the average value of the electricity price for a preset period may be calculated, and the calculated average value may be compared to the present electricity price, thus determining whether to make a purchase or a sale.

At operation S304, when the received real-time electricity price is larger than the preset value, it is determined to discharge electricity stored in the battery. On the other hand, when the received real-time electricity price is smaller than or equal to the preset value, it may be determined to charge electricity into the battery.

For example, when the present electricity price is 80% or less of the average price on the previous day and the amount of electricity charged into the battery of the charging and discharging part 340 is 30% or less of the capacitance, it may be determined to charge electricity. On the other hand, when the present electricity price is 120% or more of the average price on the previous day and the amount of electricity charged into the battery of the charging and discharging part 340 exceeds 80% of the capacitance, it may be determined to discharge electricity. Furthermore, these parameters may be set in a variety of ways according to one or more other exemplary embodiments.

As a result of the determination (operation S304), in the case where it is determined to charge the battery of the charging and discharging part 340 with electricity, the metering part 350 is controlled forwards (operation S306) so that electricity is charged (i.e., purchased) while the charge amount thereof is measured (operation S308).

In contrast, as a result of the determination (operation S304), in the case where it is determined to discharge electricity from the battery of the charging and discharging part 340, the metering part 350 is controlled backwards (operation S310) so that electricity is discharged (i.e., sold) while the discharge amount thereof is measured (operation S312).

In proportion to the electricity price, the divisions of the metering part 350 are moved, and electricity usage (i.e., the amount of electricity) to be billed may be measured depending on changes in the divisions of the metering part 350. Hence, according to an exemplary embodiment, the amount of electricity charged and discharged is measured by controlling the movement direction of the divisions of the metering part 350, whereby the electricity price to be billed may be effectively calculated.

According to another exemplary embodiment, the charging and discharging process 500 may further include adjusting a rate of discharge of electricity from the battery based on the amount of electricity stored in the battery.

Figure 4:
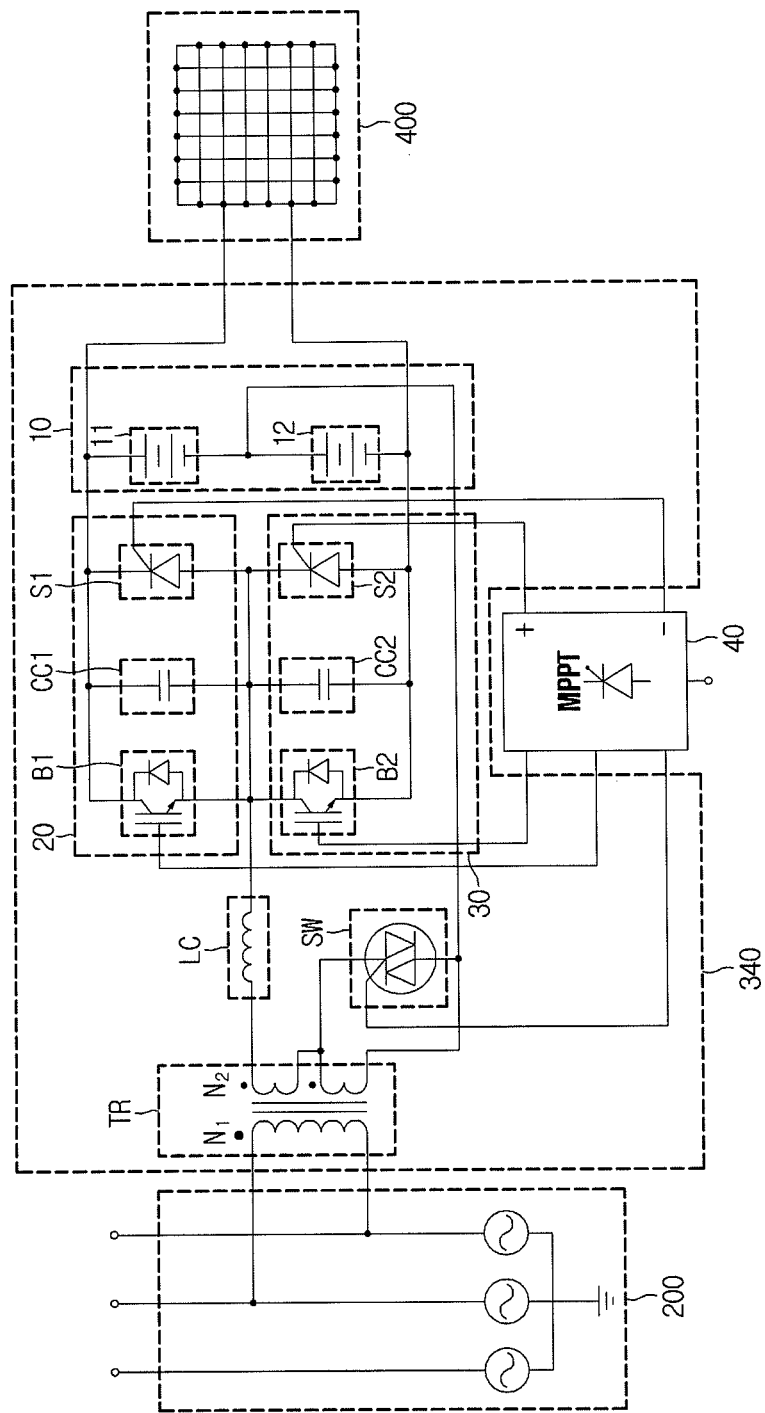
FIG. 4 is a circuit diagram showing the charging and discharging part 340 of FIG. 2 according to an exemplary embodiment.

FIG. 4 is a circuit diagram showing the charging and discharging part 340 of FIG. 2 according to an exemplary embodiment.

With reference to FIG. 4, the charging and discharging part 340 includes a battery 10, a first switching portion 20, a second switching portion 30, a transformer TR, a charge and discharge selection switch SW, and an inductor LC.

The switching elements B1, S1 of the first switching portion 20, the switching elements B2, S2 of the second switching portion 30, the transformer TR, and the charge and discharge selection switch SW may form a duplex converter (or a charge and discharge converter). This duplex converter may include an inductor LC. The duplex converter (i.e., a duplex converter device) charges electricity into and discharges electricity from the battery of the charging and discharging part of the electricity charge and discharge system for a solar light power generator in a smart grid environment with real-time pricing.

The duplex converter acts as a rectifier for converting alternating current (AC) into direct current (DC) when electricity is charged into the battery 10, and may act as an inverter for converting DC into AC when electricity is discharged from the battery 10 to the electric grid 200.

Also, the duplex converter may convert power so that power from a commercial power source (e.g., 220 V, 380 V, or 600 V) is charged into the battery 10, and may be controlled with an insulated-gate bipolar transistor (IGBT) to output a constant voltage and a constant frequency so as to enable a grid-connected power sale to the electric grid 200 of the commercial power source.

The discharge switching elements B1, B2 operate to adjust the amount of electricity stored in the battery 10 that is discharged and the time of the discharge via the control of the IGBT, and may be used to control at least one of a phase, a power factor, and power quality in order to achieve a safe grid-connected electricity sale.

The battery 10 receives electricity from the electric grid (i.e., smart grid) 200 or the solar light power generator 400 to charge the battery 10 or discharges the stored electricity to the electric grid 200.

The battery 10 may include two batteries 11, 12 which are separated from each other, and a node between the two batteries 11, 12 may be linked with a neutral line. Also, the two batteries 11, 12 may be connected in series in the same direction. Thus, the batteries 11, 12 may be equivalently charged or discharged, and the lifetime of the batteries 11, 12 may be increased.

The battery 10 may include two batteries 11, 12 separated by the neutral line, and these two batteries 11, 12 are alternately charged based on the operation of the charge switching elements S1, S2, and are alternately discharged based on the operation of discharge switching elements B1, B2.

The duplex converter acting as the rectifier or the inverter may include the first switching portion 20 and the second switching portion 30. The first switching portion 20, the second switching portion 30, and the batteries 11, 12 may be connected in series, and the first switching portion 20 includes a switching element S1, a switching element B1, and a capacitor CC1, and the second switching portion 30 includes a switching element S2, a switching element B2, and a capacitor CC2.

Furthermore, in the first switching portion 20, the switching element S1, the switching element B1, and the capacitor CC1 may be connected in parallel, and in the second switching portion 30, the switching element S2, the switching element B2, and the capacitor CC2 may be connected in parallel.

In the case where electricity is charged into the battery 10, the switching element S1 and the switching element S2 which are respectively used as the charge switching elements are alternately operated depending on the waveform of an input signal (e.g., a voltage signal or a current signal) supplied from the electric grid 200, so that electricity is charged into the battery 10.

The charge switching elements 51, S2 are selectively turned on or off based on the waveform of the signal supplied from the electric grid 200 when electricity is charged into the battery 10.

In the case where electricity stored in the battery 10 is discharged, the switching element B1 and the switching element B2 which are respectively used as the discharge switching elements are operated alternately, so that electricity is discharged to the electric grid 200.

The discharge switching elements B1, B2 are selectively turned on or off based on the waveform of the signal supplied from the battery 10 when electricity is discharged from the battery 10.

The charge switching elements S1, S2 are maintained in a turned-off state when electricity of the battery 10 is discharged, and the discharge switching elements B1, B2 are maintained in a turned-off state when electricity is charged into the battery 10.

A tip of the transformer TR on the battery 10 side is connected between the charge switching elements S1, S2 and between the discharge switching elements B1, B2. In the case where electricity is charged into the battery 10, the charge switching elements 51, S2 are turned on alternately. On the other hand, in the case where the electricity of the battery 10 is discharged, the discharge switching elements B1, B2 are turned on alternately.

According to an exemplary embodiment, the switching element may include a silicon controlled rectifier (SCR), a gate turn-off thyristor (GTO), IGBT, ICT, or a transistor (TR).

The capacitor CC1 (or the capacitor CC2) converts a square wave signal resulting from alternately operating the switching element B1 and the switching element B2 to a waveform similar to a sine wave, upon discharging electricity from the battery 10, thus preventing the generation of a shock or sparks on the electric grid 200 attributed to a drastic increase in the signal change per time and blocking the energy loss upon discharge.

The transformer TR is coupled to the electric grid 200 and the battery 10, and transforms and outputs the signal (i.e., voltage signal or current signal) supplied from the electric grid 200 or the signal supplied from the battery 10.

The transformer TR is connected to the electric grid 200, and transforms the input signal to a set level depending on the ratio of the numbers of turns (N1:N2) of both sides to output the signal.

In the case where the number of turns of a coil on one side (hereinafter, referred to as "N1 side") that is connected to the electric grid 200 is defined as N1 and the number of turns of a coil on the other side (hereinafter, referred to as "N2 side") is defined as N2, N1>N2/2 and N1<N2. The N1 of the coil of the transformer TR on the electric grid 200 side is smaller than the N2 of the coil of the transformer TR on the battery 10 side, and may be greater than half (½) (i.e., N2/2) of the N2 of the coil of the transformer TR on the battery 10 side. Thus, depending on the operation of the charge and discharge selection switch SW, it is easy to charge electricity of the electric grid 200 into the battery 10 or to discharge the electricity of the battery 10 to the electric grid 200.

The charge and discharge selection switch SW is shorted out when electricity is charged into the battery 10, whereas the charge and discharge selection switch SW is opened when the electricity of the battery is discharged.

The charge and discharge selection switch SW is selectively on/off depending on whether electricity is charged into or discharged from the battery 10, and is linked with the node for dividing the coil of the transformer TR on the battery 10 side.

The charge and discharge selection switch SW performs the switching operation, so that electricity is charged in or discharged from the battery 10 by the duplex converter. The charge and discharge selection switch SW may be embodied with, for example, a triode AC switch (TRIAC).

A tip of the charge and discharge selection switch SW is connected so that the coil of the transformer TR on the N2 side is divided into two, and the charge and discharge selection switch SW may control the operation of the transformer TR. Furthermore, the charge and discharge selection switch SW may be shorted out or may be opened depending on the determination of a maximum power point transient (MPPT) (or a control processor (CPU)) 40 of the charge and discharge determination part 330 shown in FIG. 2.

The switching operations of the switching elements B1, S1, B2, S2 and the charge and discharge selection switch SW may be controlled by the MPPT 40.

In the case where the charge and discharge selection switch SW is shorted out, the number of turns of the coil on the N1 side is much higher, so that the voltage of the electric grid 200 is dropped, thus efficiently transferring electricity of the electric grid 200 to the battery 10. In contrast, in the case where the charge and discharge selection switch SW is opened, the number of turns of the coil on the N2 side is much higher, so that the voltage of the battery 10 is raised, thus efficiently transferring electricity from the battery 10 to the electric grid 200.

The inductor LC shifts the phase of the signal when electricity is discharged, thus preventing the backflow of current, so that the electricity of the battery 10 is efficiently discharged. The tip of the transformer TR on the battery side is connected between the charge switching elements S1, S2 and between the discharge switching elements B1, B2 by means of the inductor LC.

The duplex converter may act as a rectifier when electricity is charged into the battery 10, whereas the duplex converter may act as an inverter when electricity is discharged from the battery 10.

Figure 5A:
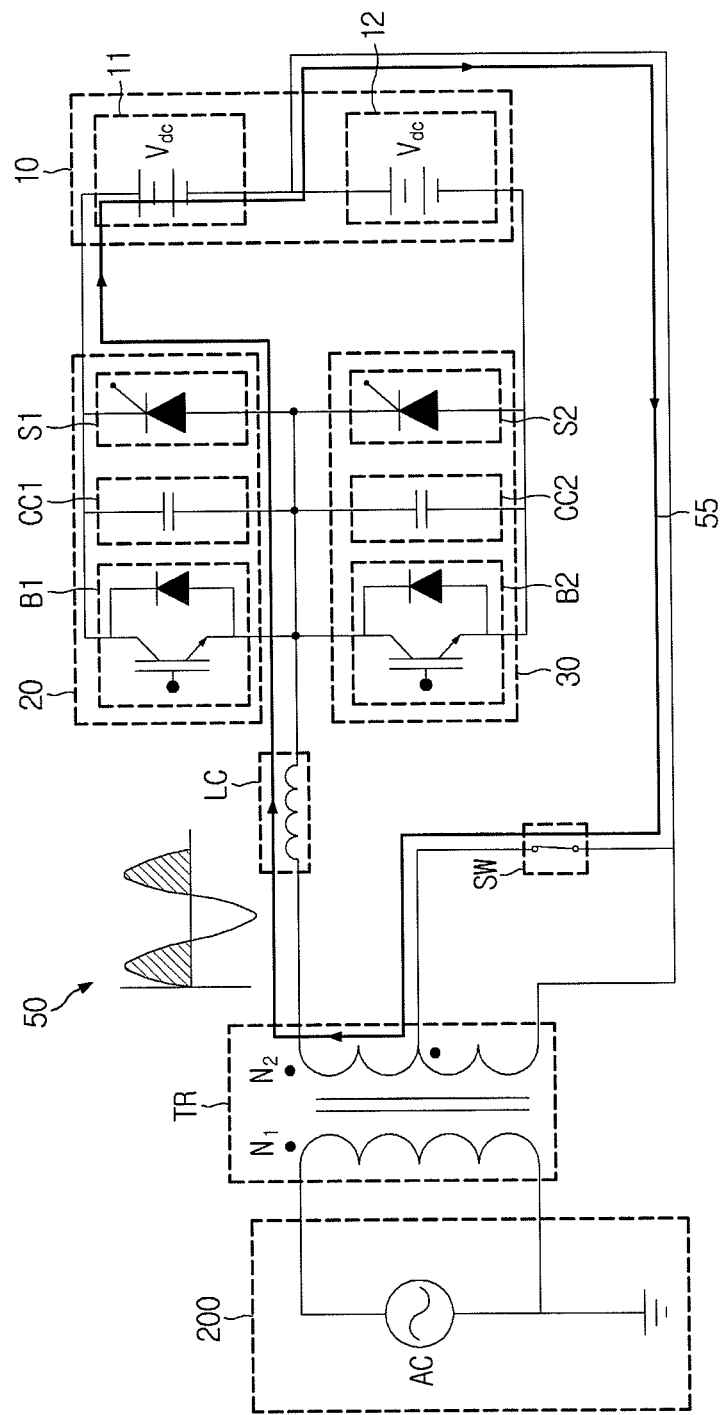
FIGS. 5A and 5B are circuit diagrams showing an operation of a duplex converter for charging electricity in a battery 10 according to an exemplary embodiment.
Figure 5B:
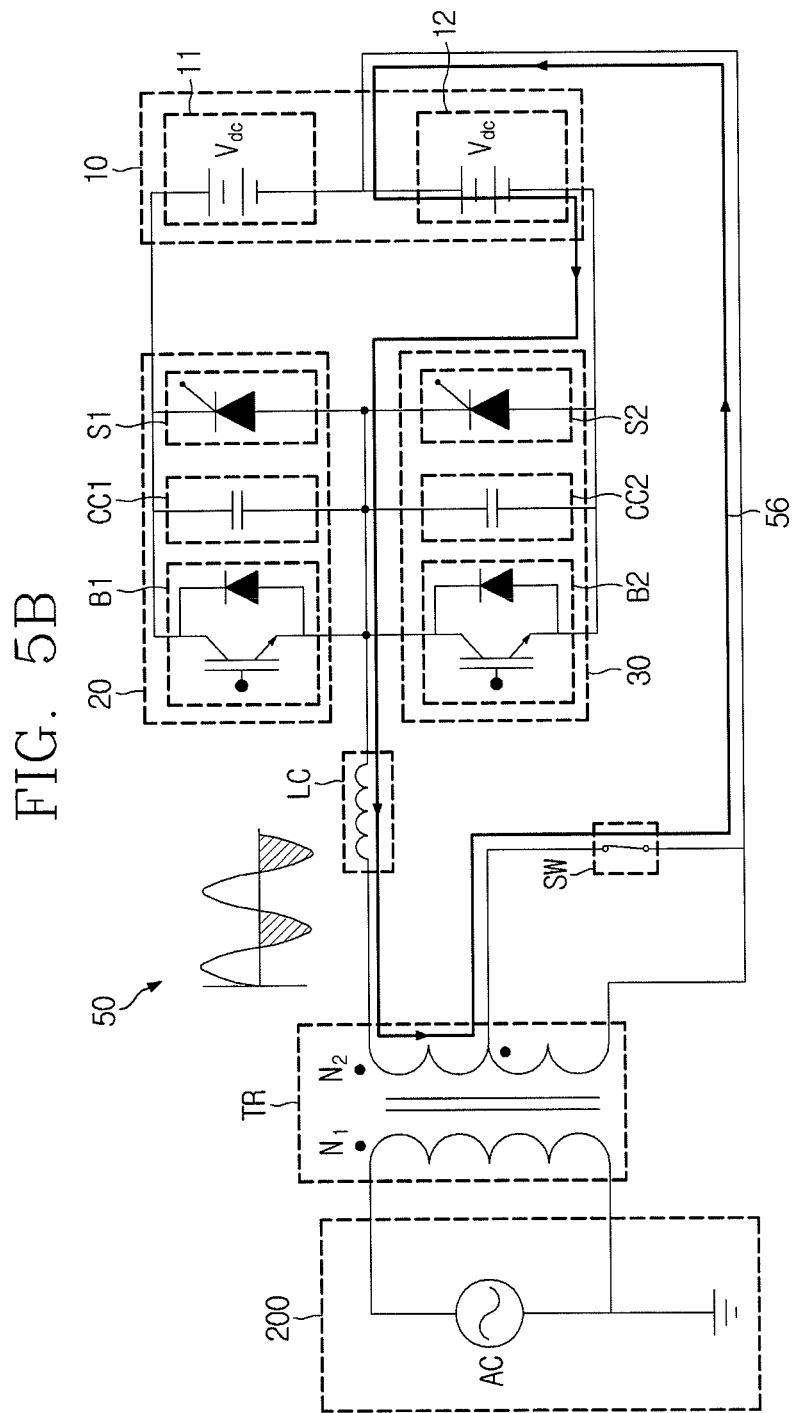

FIGS. 5A and 5B show an operation of the duplex converter for charging electricity into the battery 10 according to an exemplary embodiment.

With reference to FIGS. 5A and 5B, in the case where electricity is charged into the battery 10, the charge and discharge selection switch SW is shorted out, and thus the number of turns of the coil of the transformer TR on the N2 side is much smaller, so that electricity is charged from the electric grid 200 towards the battery 10. In FIGS. 5A and 5B, the electric grid 200 is represented by only a single phase (AC) for the sake of convenient description, and it is understood that another exemplary embodiment is not limited thereto.

First, in the case where the input signal 50 has a positive value, the switching element 51 is turned on and the switching element S2 is turned off. As shown in FIG. 5A, a current 55 flows towards the battery 11, so that electricity is charged into the battery 11. In this case, the battery 11 may maintain a DC voltage (Vdc).

Then, when the input signal 50 has a negative value, the switching element 51 is turned off and the switching element S2 is turned on. As shown in FIG. 5B, the flow of a current 56 is changed towards the battery 12, and electricity is charged into the battery 12. In this case, the battery 12 may maintain a DC voltage (Vdc).

In brief, as the alternating input signal 50 changes with time, the switching element 51 and the switching element S2 are alternately turned on, and electricity is charged into the battery 11 and the battery 12 alternately. As mentioned above, the duplex converter acts as a rectifier.

Figure 6A:
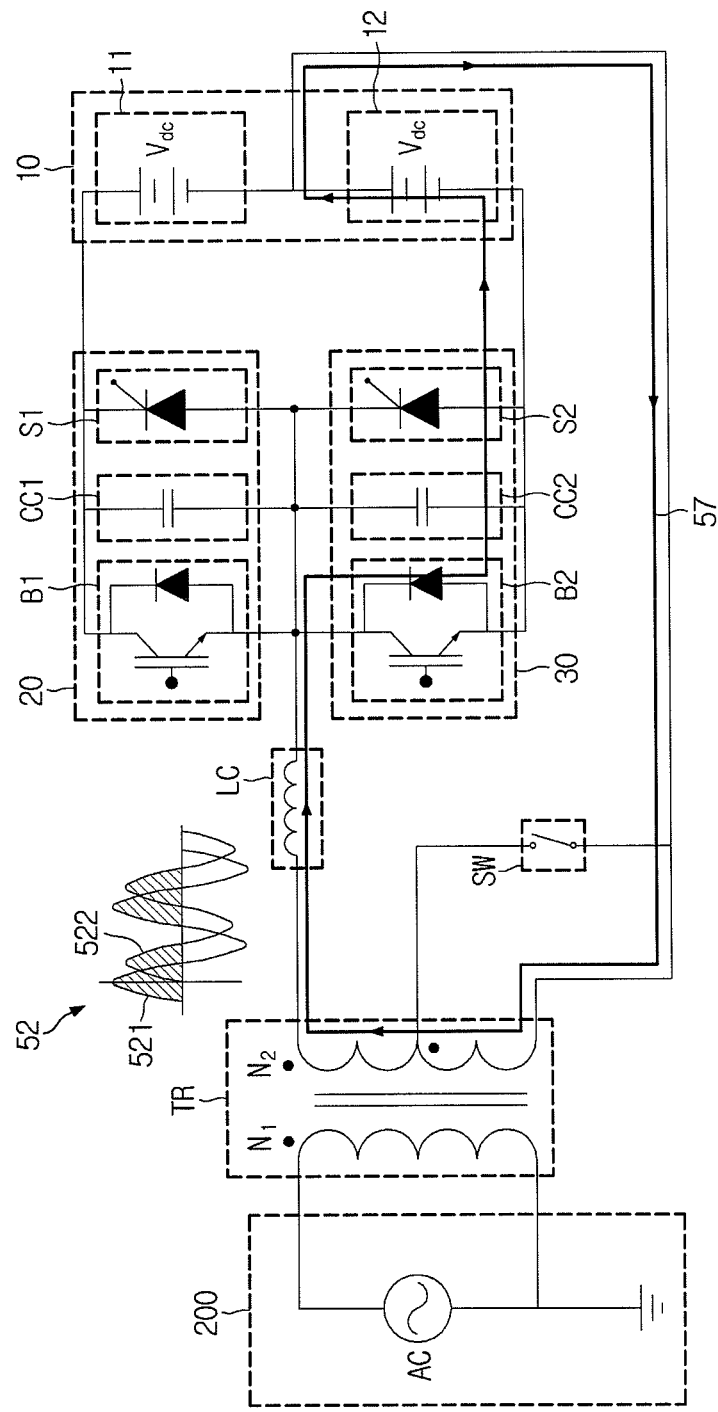
FIGS. 6A and 6B are circuit diagrams showing an operation of a duplex converter for discharging electricity from a battery 10 according to an exemplary embodiment.
Figure 6B:
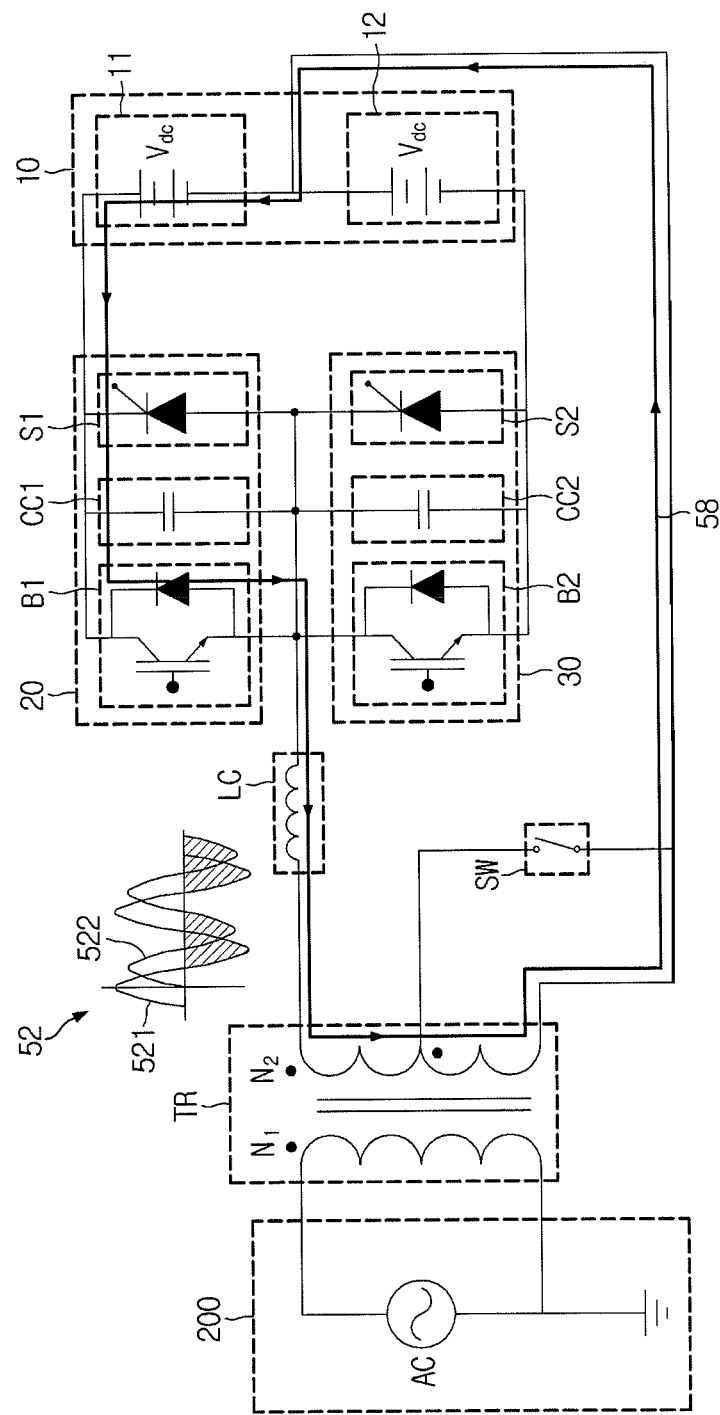

FIGS. 6A and 6B show an operation of the duplex converter for discharging electricity from the battery 10 according to an exemplary embodiment.

With reference to FIGS. 6A and 6B, in the case where electricity is discharged from the battery 10, the charge and discharge selection switch SW is opened, and thus the number of turns of the coil of the transformer TR on the N1 side is much smaller, so that electricity of the battery 10 is efficiently discharged. Furthermore, the switching element B1 and the switching element B2 are alternately on/off, whereby the electricity of the battery 11 and the electricity of the battery 12 are alternately discharged.

First, in the case where the switching element B1 is off and the switching element B2 is on, electricity of the battery 12 having a DC voltage (Vdc) is discharged. As shown in FIG. 6A, a current 57 flows towards the battery 12, and electricity is discharged from the battery 12 and thus supplied towards the electric grid 200. In FIGS. 6A and 6B, the electric grid 200 is represented by only a single phase (AC) for the sake of convenient description, though it is understood that another exemplary embodiment is not limited thereto.

Then, when the switching element B1 is on and the switching element B2 is off, as shown in FIG. 6B, a current 58 flows towards the battery 11, and electricity is discharged from the battery 11 having DC voltage (Vdc) and supplied towards the electric grid 200. The charge and discharge converter acts as an inverter as mentioned above.

The IGBT corresponding to the switching element B1 and the switching element B2 is used to adjust the switching rate, thereby regulating the rate of discharge of electricity from the battery 10 (i.e., electricity sale rate). The IGBT is used to control the pulse width modulation (PWM), and enables on/off to be rapidly controlled. As shown in FIGS. 4, 5A, 5B, 6A and 6B, the IGBT includes a transistor and a freewheeling diode.

In the case where electricity is discharged from the battery 10, a capacitor CC1 (or a capacitor CC2) converts a square wave signal resulting from alternately turning on/off the switching element B1 and the switching element B2 to a sine form, thus preventing the generation of a shock or sparks on the electric grid 200 attributed to the drastic increase in the signal change per time and blocking energy loss upon discharge.

Also, the inductor LC shifts the phase of the signal, and thus prevents the backflow of current and enables the electricity of batteries 11, 12 to be efficiently discharged. More specifically, the inductor LC (or upon discharge, the inductor LC, the transformer TR and the charge and discharge selection switch SW) is responsible for phase shift conversion. As shown by reference numeral 52 in FIGS. 6A and 6B, a signal 521 of the duplex converter (i.e., a charge and discharge converter) goes ahead by a predetermined phase on the transverse axis (i.e., time or phase axis) compared to a signal 522 of the electric grid 200. The magnitude (i.e., amplitude) of the signal 521 may be greater than that of the signal 522 by the transformer TR and the charge and discharge selection switch SW.

Figure 7:
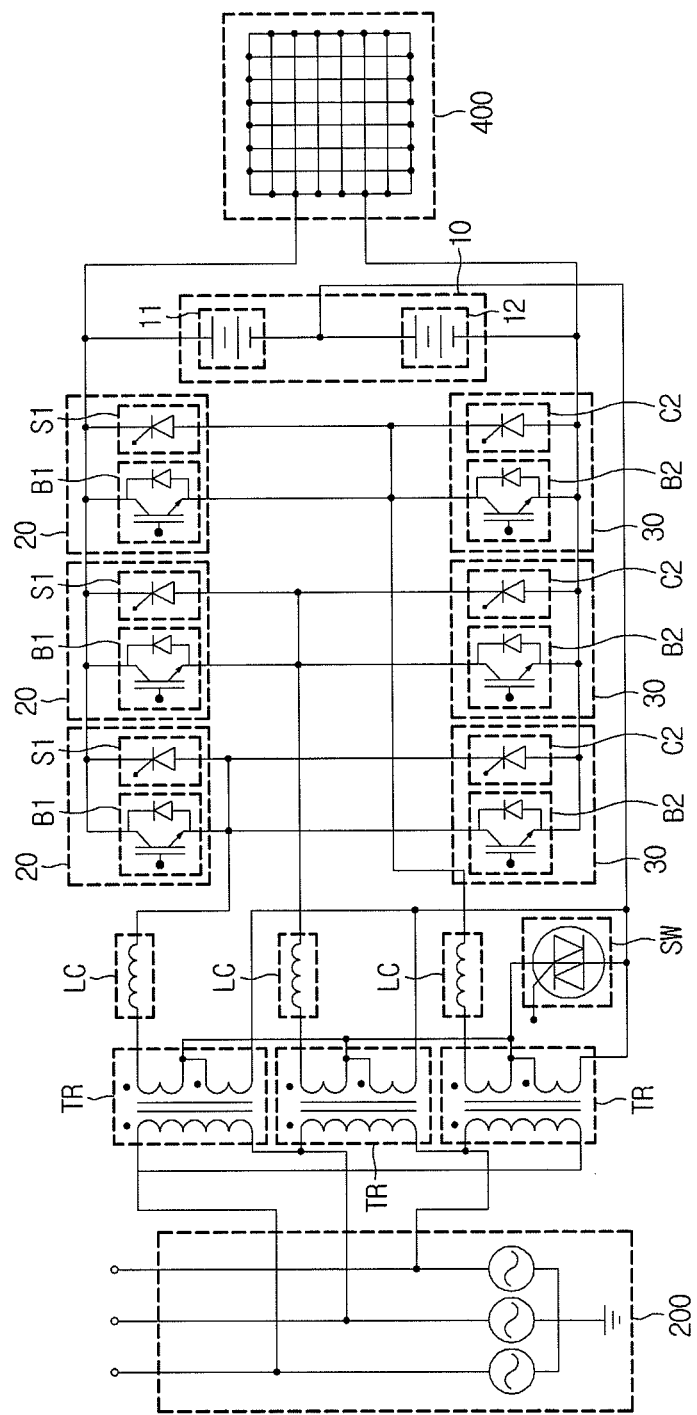
FIG. 7 is a circuit diagram showing a charging and discharging part according to another exemplary embodiment.

FIG. 7 shows a charging and discharging part according to another exemplary embodiment.

With reference to FIG. 7, the duplex converter (i.e., a charge and discharge converter) provided in the charging and discharging part is embodied in a three-phase circuit and thus may be connected to the electric grid 200 and the solar light power generator 400. In FIG. 7, the capacitor CC1 is omitted from among respective first switching portions 20, and the capacitor CC2 is omitted from among respective second switching portions 30. However, according to another exemplary embodiment, the capacitor CC1 may be connected in parallel to the switching elements B1 included in respective first switching portions 20, and the capacitor CC2 may be connected in parallel to the switching elements B2 included in respective second switching portions 30.

Figure 8:
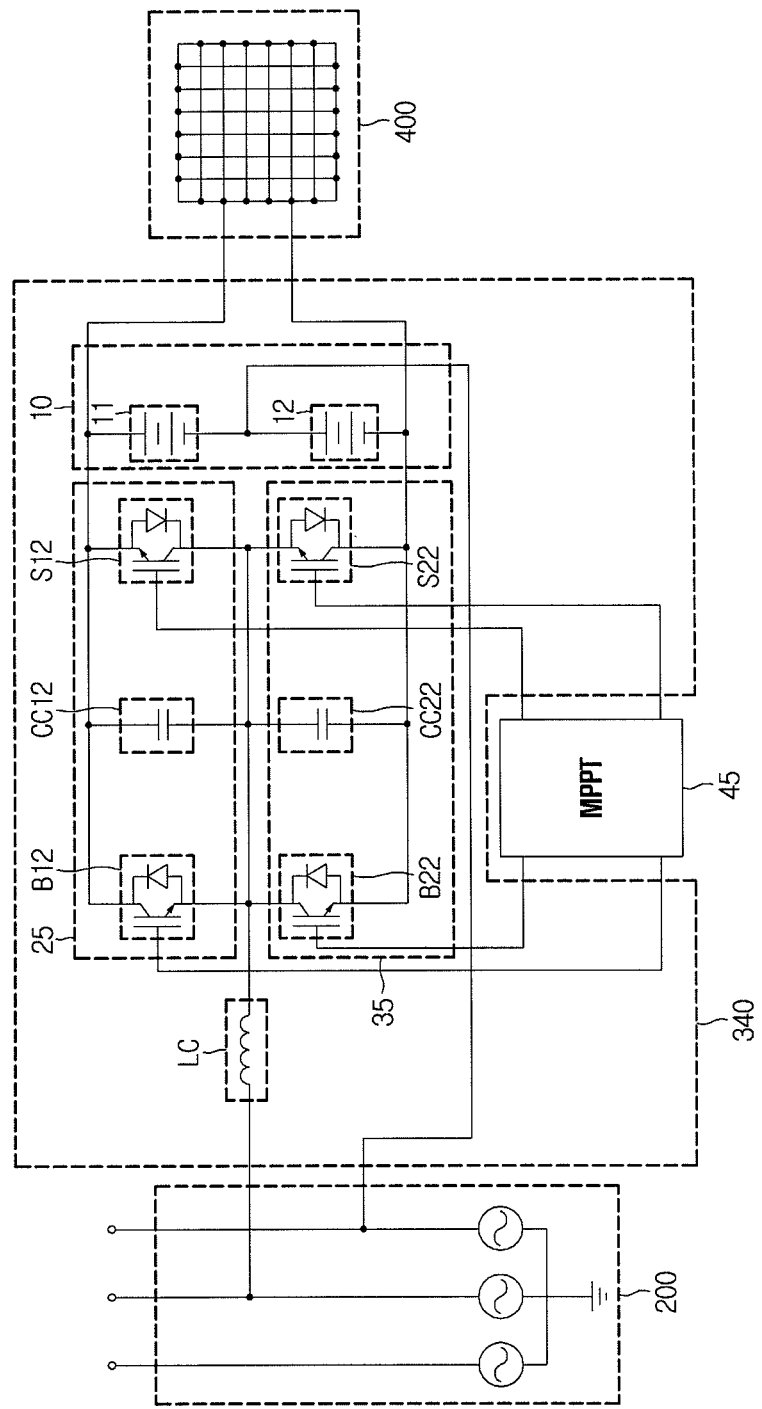
FIG. 8 is a circuit diagram showing a charging and discharging part 340 according to another exemplary embodiment.

FIG. 8 shows a charging and discharging part 340 according to another exemplary embodiment.

With reference to FIG. 8, the charging and discharging part 340 includes a battery 10, a first switching portion 25, a second switching portion 35, and an inductor LC. The first switching portion 25 includes switching elements B12, S12 and a capacitor CC12, and the second switching portion 35 includes switching elements B22, S22 and a capacitor CC22. The battery 10, the capacitors CC12, CC22, and the switching elements B12, S12, B22, S22 which are PWM switches may form a flyback system.

The charging and discharging part 340 of FIG. 8 illustrating a circuit diagram has neither a transformer TR nor a charge and discharge selection switch SW, compared to the charging and discharging part 340 of FIG. 4. Furthermore, the switching elements B1, 51, B2, S2 of FIG. 4 are replaced with switching elements B12, S12, B22, S22 which are PWM switches in FIG. 8. The charging and discharging part 340 shown in FIG. 8 is configured such that the transformer TR and the charge and discharge selection switch SW are removed from the charging and discharging part 340 of FIG. 4, and a tip of the inductor LC is directly connected to the electric grid (i.e., smart grid) 200 without the transformer TR, and the neutral line between two batteries 11, 12 is directly connected to the electric grid 200 without the transformer TR. The PWM switch may be, for example, an IGBT. Thus, the description that overlaps that of FIG. 4 is omitted in FIG. 8.

The switching elements B12, S12 of the first switching portion 25 and the switching elements B22, S22 of the second switching portion 35 may form a duplex converter. The duplex converter may include an inductor LC. The duplex converter charges and discharges electricity into/from the battery of the charging and discharging part of the charging and discharging system for a solar light power generator in a smart grid environment with real-time pricing.

The duplex converter acts as a rectifier for converting AC into DC when electricity is charged into the battery 10, whereas the duplex converter acts as an inverter for converting DC into AC when electricity is discharged from the battery 10 to the electric grid 200.

The discharge switching elements B12, B22 may be used to adjust the amount of electricity stored in the battery 10 to be discharged and the time of the discharge via the control of the IGBT and to control at least one of a phase, a power factor and a power quality in order to achieve a safe grid-connected electricity sale.

The battery 10 receives electricity from the electric grid (i.e., smart grid) 200 or the solar light power generator 400 to be charged or the battery 10 discharges the stored electricity to the smart grid 200.

The battery 10 may include two batteries 11, 12 separated by a neutral line, and these two batteries 11, 12 are alternately charged based on operation of the charge switching elements S12, S22, and are alternately discharged based on the operation of discharge switching elements B12, B22.

In the case where electricity is charged into the battery 10, the switching element S12 and the switching element S22 which are respectively used as the charge switching elements are alternately operated depending on the waveform of the input signal supplied from the smart grid (i.e., electric grid) 200, thus charging the battery 10 with electricity.

Upon charging the battery 10, the charge switching elements S12, S22 are selectively turned on or off, similarly to the charge operation of the duplex converter of FIGS. 5A and 5B as above, based on the waveform of the signal supplied from the smart grid 200.

As such, in the case where either of the charge switching elements S12, S22 is turned on, the voltage of the smart grid 200 is raised and may be charged into the battery 10 by the control of the PWM to adjust the turn-on time and the turn-off time of the turned-on charge switching element and by the voltages stored in the capacitors CC12, CC22 upon charging the battery 10. For example, when the signal of the smart grid 200 has a positive value as in the reference numeral 50 of FIG. 5A, the voltage stored in the capacitor CC12 may be used. Also, when the signal of the smart grid 200 has a negative value as in the reference numeral 50 of FIG. 5B, the voltage stored in the capacitor CC22 may be used.

In the case where electricity stored in the battery 10 is discharged, the switching element B12 and the switching element B22 which are respectively used as the discharge switching elements are alternately operated, thus discharging electricity to the smart grid 200.

When electricity stored in the battery 10 is discharged to the smart grid 200, the discharge switching elements B12, B22 are selectively turned on or off, similarly to the discharge operation of the duplex converter of FIGS. 6A and 6B as above, based on the waveform of the signal supplied from the battery 10.

As such, in the case where either of the discharge switching elements B12, B22 is turned on, the raised voltage of the battery 10 may be discharged to the smart grid 200 by the control of the PWM to adjust the turn-on time and the turn-off time of the turned-on discharge switching element. The raised voltage of the battery 10 thus discharged may have a stepped sine waveform by the control of the PWM. In the PWM control, a plurality of pulses has widths in which the width of the intermediate pulse is the greatest and the widths of other pulses become narrowed towards both sides of the intermediate pulse.

The charge switching elements S12, S22 are maintained in a turned-off state when electricity of the battery 10 is discharged, and the discharge switching elements B12, B22 are maintained in a turned-off state when electricity is charged into the battery 10.

The switching operations of the switching elements B12, S12, B22, S22 may be controlled by a control unit, e.g., an MPPT 45. The MPPT 45 is a control processor provided in the charge and discharge determination part 330 of FIG. 2.

The capacitor CC12 (or the capacitor CC22) converts a square wave signal resulting from alternately operating the switching element B12 and the switching element B22 to a waveform similar to a sine wave upon discharging the electricity from the battery 10, thus preventing the generation of a shock or sparks on the smart grid 200 attributed to the drastic increase in the signal change per time and blocking energy loss upon discharge.

The inductor LC operates as a phase shift converter, and shifts the phase of the signal upon discharging the electricity, thus preventing the backflow of current, so that the electricity of the battery 10 is efficiently discharged.

The inductor LC is connected between the charge switching elements S12, S22 and between the discharge switching elements B12, B22. The phase of the signal (i.e., voltage signal) discharged from the battery 10 by the inductor LC may lead the phase of the signal (i.e., voltage signal) of the smart grid. According to another exemplary embodiment, even by the circuit combination of the inductor LC, the battery 10 and the PWM switches B12, B22 under control of the PWM, the phase of the signal (i.e., voltage signal) discharged from the battery 10 may lead the phase of the signal (i.e., voltage signal) of the smart grid.

The duplex converter acts as a rectifier when electricity is charged into the battery 10, and acts as an inverter when electricity is discharged from the battery 10.

In brief, the charging and discharging part 340 shown in FIG. 4 drops the signal (i.e., voltage signal) of the electric grid (i.e., smart grid) 200 and charges the battery 10 with the signal by using the charge and discharge selection switch SW that performs the switching operation depending on the control of the MPPT 40 and the transformer TR, and raises the electricity charged into the battery 10 and thus discharges the electricity to the electric grid 200. However, the charging and discharging part 340 shown in FIG. 8 raises the signal (i.e., voltage signal) of the smart grid (i.e., electric grid) 200 and charges the battery 10 with the signal by using the PWM switches S12, S22 controlled by the MPPT 45 and the capacitors CC12, CC22 instead of the transformer TR and the charge and discharge selection switch SW, and discharges the raised voltage charged into the battery 10 to the smart grid 200 by using the PWM switches B12, B22 controlled by the MPPT 45.

As mentioned above, based on real-time pricing of the electric grid under a smart grid environment, energy from the generation of solar light energy in the daytime that has been stored is sold at an optimal price, and energy is stored in the battery of the charging and discharging system using energy of the electric grid when the energy price of the electric grid is low, e.g., at nighttime, and may thus be mainly sold at the optimal price in, e.g., the daytime.

To this end, an exemplary embodiment may include a single power conversion system (i.e., a charge and discharge duplex converter) including a DC to DC converter (i.e., a battery) for charging solar light energy or energy of the electric grid, a maximum power point tracking or maximum power point transient (MPPT) system for maximally utilizing solar light energy production, a grid-connected inverter for selling electricity that the battery was charged with to the electric grid based on a determination made by the charge and discharge determination part, and a rectifier for using energy of the electric grid to charge the battery when the electricity price of the electric grid is low.

Also, according to an exemplary embodiment, electricity may be charged into the battery from the solar light power generator, and energy that was used to charge the battery may be sold, and making a sale via the charge and discharge behavior using the electric grid is possible. Furthermore, the real-time power price change of the electric grid, information about the amount charged and discharged, billing information, and setting of the charging and discharging system according to an exemplary embodiment may be transmitted to or received from a user via wired/wireless communication.

Also, billing may be effectively carried out depending on the charging and discharging of electricity according to an exemplary embodiment. In an exemplary embodiment, a charge and discharge converter having stable performance by which both charging and discharging may be carried out and which is simply designed may be provided.

Meanwhile, a method according to an exemplary embodiment may be executed using a computer program. The codes and the code segments of the above program may be easily deduced by the computer programmer of the art. The program thus made is stored in a recording medium (i.e., information storage medium) that is readable by a computer, and is read and executed by the computer, thereby embodying the method. The recording medium may include any recording medium so long as it is readable by the computer.

As described hereinbefore, one or more exemplary embodiments provide a charging and discharging system for a solar light power generator in a smart grid environment with real-time pricing, a duplex converter of the charging and discharging system, and a charging and discharging method for a solar light power generator. According to an exemplary embodiment, electric energy generated by a solar light power generator may be sold to an electric grid in the daytime based on the real-time electricity price of the electric grid. Because a solar light power generator cannot operate and a battery provided therein does not operate at nighttime, power is charged into the battery using electric energy in which a power price of the electric grid is comparatively low, and is sold via discharge in the daytime when the price of power is high. Accordingly, the charging and discharging system according to an exemplary embodiment can maximally operate, and can make marginal profits.

Also, according to an exemplary embodiment, a total of the four devices (system) of a DC to DC converter (i.e., a battery) for charging solar light energy or energy of the electric grid, an MPPT system for maximally utilizing solar light energy production, a grid-connected inverter for selling electricity that a battery was charged with to the grid, and a rectifier for charging electric energy of the electric grid into the battery when the electricity price of the electric grid is low can be embodied in a single power conversion system, thus reducing installation space, purchase cost, and operating cost.

Also, according to an exemplary embodiment, billing for the purchase and sale of electricity can be efficiently performed upon charging and discharging. In an exemplary embodiment, the installation space is small and mobility becomes very high, thanks to the use of a duplex converter responsible for both charging and discharging.

Also, according to an exemplary embodiment, electricity (i.e., power) is purchased from an electric grid such as a smart grid and is sold to the electric grid, based on the real-time electricity price information and the charge information of the battery, thereby improving the operation of the charging and discharging system, so that a user of the charging and discharging system can enjoy marginal profits.

Although exemplary embodiments have been disclosed for illustrative purposes, those skilled in the art will appreciate that a variety of different modifications, additions and substitutions are possible, without departing from the scope and spirit of the inventive concept as disclosed in the accompanying claims. Accordingly, such modifications, additions and substitutions should also be understood as falling within the scope of the present inventive concept.

What is claimed is:

1. A charging and discharging system for a solar light power generator in a smart grid environment with real-time pricing, the charging and discharging system comprising:
   an electricity price monitoring part which collects electricity price information from an electric grid;
   an electricity charge amount monitoring part which collects electricity charge amount information of a battery of the charging and discharging system;
   a charge and discharge determination part which determines, based on the collected electricity price information and the collected electricity charge amount information, whether electricity supplied from the electric grid is to be charged into the battery or whether electricity stored in the battery via at least one of the electric grid and the solar light power generator is to be discharged to the electric grid; and
   a charging and discharging part which selectively performs one of charging the battery and discharging the battery based on the determination made by the charge and discharge determination part: and
   a metering part which measures electricity usage based on an amount of electricity charged into the battery and an amount of electricity discharged from the battery and which calculates an electricity price based on the measured electricity usage.

2. The charging and discharging system of claim 1, wherein the electricity price monitoring part collects electricity price information that varies with time from the electric grid, and the metering part calculates the electricity price based on the collected electricity price information that varies with time.

3. The charging and discharging system of claim 2, wherein when the electricity is charged into the battery, the metering part performs a forward measurement based on the amount of the charged electricity, and when the electricity is discharged from the battery, the metering part performs a backward measurement based on the amount of the discharged electricity, and the metering part measures the amount of electricity so that the electricity price is calculated differently depending on the collected electricity price information that varies with time.

4. The charging and discharging system of claim 1, wherein the electricity price monitoring part collects electricity price information varying with time from the electric grid, and the charge and discharge determination part determines to discharge the electricity stored in the battery when the collected electricity price information varying with time is larger than a preset value, and determines to charge the battery with the electricity when the collected electricity price information is smaller than or equal to a preset value.

5. The charging and discharging system of claim 4, wherein the charge and discharge determination part determines whether the electricity is to be charged into the battery or is to be discharged from the battery by calculating an average value of collected electricity price information varying with time for a preset period and comparing the average value to a present electricity price.

6. The charging and discharging system of claim 1, wherein the charging and discharging part adjusts a rate of discharge when the electricity is discharged from the battery.

7. The charging and discharging system of claim 1, wherein the charge and discharge determination part determines, based on the collected electricity price information and the collected electricity charge amount information, whether electricity stored in the battery via the electric grid is to be discharged to the electric grid.

8. A method of charging and discharging electricity into/from a battery of a charging and discharging part of a charging and discharging system for a solar light power generator in a smart grid environment with real-time pricing, the method comprising:
   receiving electricity price information from an electric grid;
   receiving electricity charge amount information of the battery;
   determining whether electricity is to be purchased from the electric grid or whether electricity stored in the battery via at least one of the electric grid and the solar light power generator is to be sold to the electric grid, based on the received electricity price information and the received electricity charge amount information; and;
   selectively performing one of charging and discharging the battery, based on a result of the determining: and
   measuring electricity usage based on an amount of electricity charged into the battery and an amount of electricity discharged from the battery and calculating an electricity price based on the measured electricity usage.

9. The method of claim 8, wherein the received electricity price information varies with time.

10. A computer readable recording medium having recorded thereon a program executable by a computer for performing the method of claim 8.

* * * * *